Patented July 7, 1942

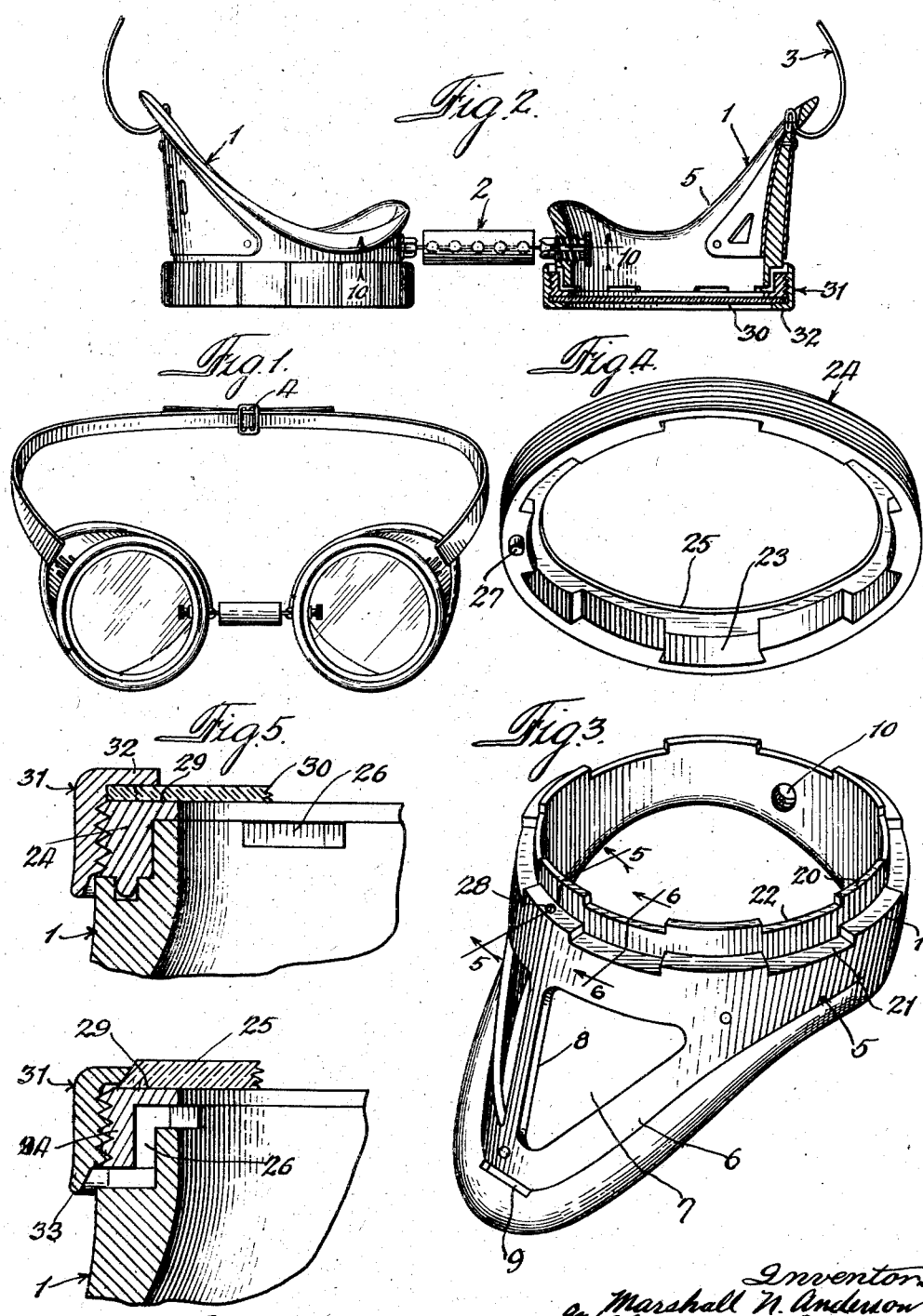

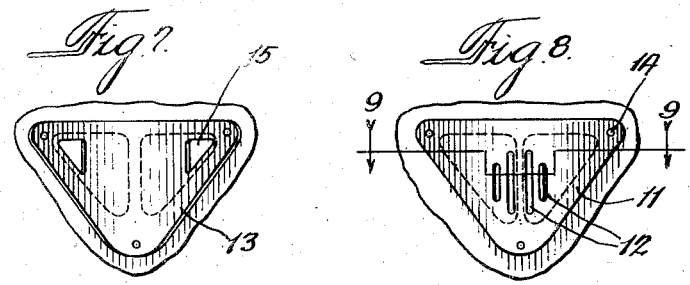
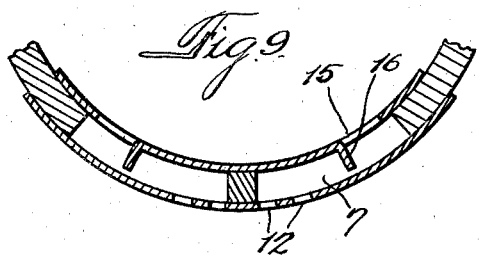
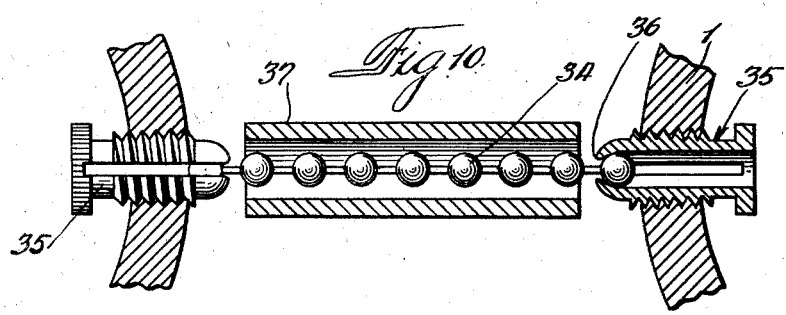
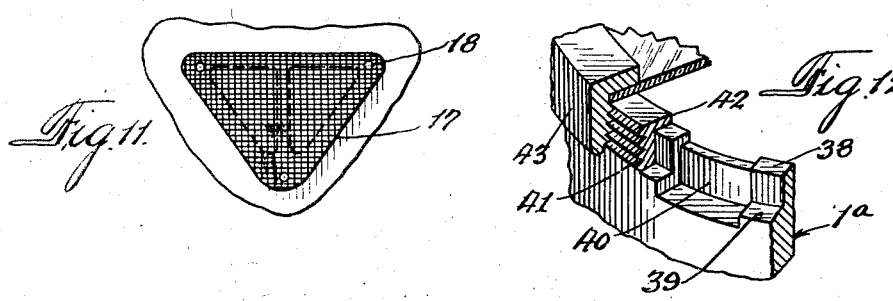

2,288,664

UNITED STATES PATENT OFFICE 2,288,664

INDUSTRIAL GOGGLES

Marshall N. Anderson, Chicago, and Clifford L. Roe, Geneva, Ill., assignors to Sellstrom Manufacturing Company, Chicago, Ill., a corporation of Illinois Application March 25, 1940, Serial No. 325,708

11 Claims. (Cl. 2—14)

This invention relates to goggles and more particularly to industrial goggles adapted for use in connection with welding, grinding, or other industrial operations in which it is desired to protect the eyes from heat and light or from sparks and other flying particles, and also wherein proper ventilation may be provided.

The eyecups or lens mounts and associated bezels are preferably made of suitable molded insulating material, such as Bakelite, plastics, suitable metals or the like, and heretofore the complicated tools and involved molding operations required in connection with the production of the various elements, whereby suitable ventilation and other desirable features may be provided, have been very expensive, and such methods of manufacture have not been well suited to high speed quantity production.

It is an object of the present invention to provide a new and novel improved structure as a whole, and particularly novel structures and relationships of the individual elements, whereby the cost of production, especially in so far as the molding operations are concerned, is very materially reduced without sacrificing any desirable characteristics. It has been found that, where heretofore certain parts have been made integral, it is possible, when they are separately formed and arranged to cooperate in accordance with the present invention, to reduce the cost of the individual elements as well as the cost of the entire finished article more than one-half. Also, better ventilation and a distinct improvement in other features have been obtained.

It is, therefore, an object of the present invention to provide a structure whereby industrial goggles may be produced at a greatly reduced cost, and whereby they may easily and quickly be assembled and provide the required safety features including efficient ventilation and exclusion of light without additional work on the molded elements other than simple molding and assembly of the various parts; also, whereby suitable adjustments may be provided and the entire device easily and quickly assembled to provide a satisfactory structure which will not easily get out of order.

Another object is the provision of industrial goggles having molded eyecups with flat uninterrupted lens seats and in which each cup is provided with light-excluding tortuous passages through the side walls and terminating closely adjacent the lens seat and arranged for substantially uniform ventilation of the inner surface of the lens.

Further objects will be apparent from the specification and the appended claims.

In the drawings:

Fig. 1 is a front view of one embodiment of the invention and illustrates a completely assembled pair of goggles.

Fig. 2 is a top view of the embodiment shown in Fig. 1 with one of the eyecups or lens mounts shown in horizontal section.

Fig. 3 is a perspective view of the base member of one of the eyecups.

Fig. 4 is a perspective view of the threaded ventilating ring or lens seat in position to be assembled on the base member shown in Fig. 3.

Fig. 5 is a detail sectional view taken on a line substantially corresponding to line 5—5 of Fig. 3 after the threaded ring shown in Fig. 4, and the lens and lens clamping ring or bezel shown in Fig. 1 are assembled thereon.

Fig. 6 is a view similar to that shown in Fig. 5, but taken on a line corresponding to line 6—6 of Fig. 3, and with a lens-holding ring or bezel adapted for beveled lenses assembled thereon.

Fig. 7 is a side elevation of the inner ventilating plate.

Fig. 8 is an elevation of the outer ventilating plate which cooperates with the inner plate shown in Fig. 7 to provide ventilation and at the same time prevent light entering the lens mounting base.

Fig. 9 is a sectional view through the ventilating plates and base shown in Figs. 7 and 8 and is taken on a line substantially corresponding to line 9—9 of Fig. 8.

Fig. 10 is a sectional view through the flexible nose piece or bridge and is taken on a line substantially corresponding to line 10—10 of Fig. 2.

Fig. 11 is an outside elevation of a foraminated ventilating plate which may be used in place of the plates shown in Figs. 7 and 8 when it is not necessary to prevent light entering the eye piece.

Fig. 12 is a fragmentary sectional perspective view of one of the assembled eyecups and illustrates a slightly modified embodiment of the invention.

Referring to the drawings in detail, the embodiment illustrated comprises a pair of eyecups 1 connected together by means of a flexible nose piece or bridge 2 and preferably having an elastic strap 3 secured to each eyecup with one of the straps provided with a buckle 4 by which the goggles may be secured in place on the head of the wearer.

Each of the eyecups 1 comprises a generally tubular base 5 having its inner edge contour substantially as shown to fit the facial contour of the wearer. The tubular or ring-like base 5 is of such a contour that a comparatively long rearwardly extending temple portion 6 is formed on the outer side thereof and provided with enlarged substantially triangular openings 7 therethrough separated by a comparatively narrow rib 8. The inner end of portion 6 is provided with a slot 9 to receive one of the elastic straps 3, and a threaded opening 10 is provided at the opposite side of the member to receive the thumb screw of an adjustable nose piece which will later be described.

The triangular openings 7 are preferably covered on their outer side by means of a triangular plate 11 (Fig. 8) having perforations 12 therein preferably in the form of slots, as shown, to provide ventilation. An inner plate 13 of similar contour is secured to the inner side of the base 5 and covers the triangular openings 7 in the same manner as the plate 11 covers the openings on the outside. These two plates may be secured in position by means of rivets 14 extending through the base, whereby both of the plates may be assembled and secured simultaneously. The inner plate 13 is provided with openings 15 therethrough which communicate through the triangular openings 7 with the slots 12 to provide suitable ventilation. The openings 15 are offset from the slots 12 to prevent the direct passage of light therethrough. The inner edges of the openings 15 are preferably turned inwardly, as shown at 16 (Fig. 9), to provide a shield which further obstructs the light, but at the same time enables suitable ventilation. The plates are preferably provided with light-absorbing surfaces.

When the exclusion of light is not an important factor and it is desired merely to prevent the entrance of sparks or flying particles, a foraminated plate 17, such as shown in Fig. 11, may be used preferably on the outer side of the base, and this plate may be either a very fine wire mesh or a plate having very fine perforations therethrough which effectively prevent foreign particles from entering the eyecup and at the same time provide suitable ventilation. This plate may be secured by means of rivets 18 in the same manner as previously described. The eyecup elements are preferably made of suitable plastic material such as Bakelite or the like, although the plates just described may be of metal, if desired.

The base 5 is provided adjacent its outer edge with an annular interrupted shoulder 19 (Fig. 3), the formation of which provides a comparatively thin upstanding annular flange 20 at the outer edge of the base. The shoulder is provided with spaced notches 21 which are preferably in alignment with similar notches 22 in the upstanding flange 20. These notches are intended to cooperate with corresponding notches 23 in an externally threaded molded ring 24 which is provided at its outer edge with an inturned comparatively thin flange 25. The notches 23 preferably correspond in annular extent with the notches 21 and 22 so that, when the ring 24 is telescoped over the upstanding flange 20 of the base, it will rest on the shoulder 19 of the base and each aligned set of notches will provide a tortuous light-excluding ventilating passage 26 between the ring 24 and the base 5.

The ring 24 is preferably cemented on the base 5 and may be provided with a lug 27 for engagement in a notch 28 in the base whereby the parts may relatively be positioned to align all of the notches to thereby provide a series of ventilating passages similar to that shown in Fig. 6. After the ring is cemented on the base, the parts become substantially an integral structure with ventilating passages therethrough, terminating closely adjacent the inner surface of the lens to thereby reduce "fogging" and the like. The tortuous shape of each passage effectively prevents light from entering therethrough. The construction of the base and ring elements is such that the dies and manufacturing processes are extremely simple, and, therefore, they may easily and cheaply be produced in quantity production.

The ring 24 is provided with a substantially flat outer surface 29 (Fig. 6), and a lens 30 of any suitable type, either clear or colored, may be placed thereon and removably secured by means of an internally threaded bezel 31 having an inturned flange 32 for engaging the lens. The internally threaded bezel 31 extends sufficiently beyond the threads, as shown at 33 in Fig. 6, to shield the entrances to the ventilating openings in the manner shown, thereby further preventing the entrance of light or foreign particles into the eyecups.

The eyecups 1 are connected together by means of the flexible nose piece or bridge 2, and this bridge comprises a flexible member 34 (Fig. 10), preferably in the form of a short length of ball chain such, for instance, as commonly used as pull chains for electric sockets. A tubular split thumb screw 35 is threaded into each of the openings 10 in the respective eye pieces 1, and these thumb screws are each provided with a reduced opening 36 at the inner end and may be expanded so that one or more of the balls of the chain 34 may be inserted and retained therein after the thumb screw is threaded in place in the eyecup. In goggles of this type, it is desirable that the nose piece or bridge be adjustable in order that the goggles may be adapted to the facial characteristics of the user. It will, therefore, be apparent that, in order to adjust the length of the bridge, it is only necessary to turn one or both of the thumb screws or bushings 35 in a direction to provide the desired adjustment. The construction just described provides for considerable adjustment in view of the fact that more than one of the balls of the chain 34 may be entered in the tubular member 35, and therefore the bridge may be lengthened or shortened as desired, or a considerable degree of adjustment may be obtained by means of the thumb screws alone. A resilient guard or pad is provided on the chain 34 and may comprise a flexible rubber tube 37 placed thereover.

Fig. 12 illustrates a slightly modified embodiment in which the eyecup 1a is provided with an upstanding inner flange 38 and an outer annular shoulder 39. The outer end of the eyecup including the shoulder and flange is provided with a series of irregular notches 40. An externally threaded ring 41 having an inturned flange 42 is telescoped snugly over the flange 38 and against the shoulder 39 and cemented thereto to form an integral eyecup having an externally threaded end with a flat lens seat and light-excluding, tortuous ventilating passages therethrough closely adjacent the lens seat. The lens is removably secured in place by means of a threaded bezel 43 similar to those previously described and which may overhang the ventilating passages in the same manner.

Modifications may be made without departing from the spirit of the invention, and it is therefore desired that the invention be limited only by the prior art and the scope of the appended claims.

Having thus described this invention, what is claimed and desired to be secured by Letters Patent is:

1. A molded eyecup for goggles comprising a generally tubular member having its forward end terminating in a lens seat, and means to secure a lens to said seat, the walls of said cup having light-excluding tortuous ventilating passages therethrough with their inner ends terminating closely adjacent said lens seat and their outer ends terminating a material distance rearwardly from said lens seat, said lens securing means having a skirt overhanging but spaced from the outer ends of said passages to provide further light excluding means.

2. A molded plastic eyecup for goggles comprising a generally tubular separately molded base member having one edge conforming generally with facial contour, a separately molded lens seat member telescopically mounted on said base member and permanently secured thereto to form an integral eyecup, the contour of the adjacent surfaces being related to provide light-excluding tortuous ventilating passages therebetween terminating closely adjacent the inner surface of a lens supported on said lens seat member.

3. A molded plastic eyecup for goggles comprising a separately molded generally tubular base member having one edge conforming generally with facial contour, a separately molded lens seat member telescopically mounted on said base member and secured thereto to form a substantially integral eyecup, the contour of at least one of the adjacent surfaces being arranged to provide a series of radially disposed circumferentially distributed light-excluding tortuous ventilating passages between said members after they are secured together.

4. An eyecup comprising a substantially tubular base portion having its inner edge conforming generally to facial contour and its forward end terminating in an outwardly extending notched flange having a notched shoulder at the base of said flange, an externally threaded ring fixedly secured in telescoped relation on said flange and against said shoulder and having its outwardly facing surface forming a lens seat, said ring having complemental notches therein cooperating with said flange notches and said shoulder notches to provide light excluding tortuous passages through the wall of said eyecup, and a lens retaining bezel threaded on said ring.

5. An eyecup comprising a substantially tubular base portion having its inner edge conforming generally to facial contour and its forward edge terminating in an outwardly extending notched flange and a correspondingly notched shoulder at the base of said flange, a ring secured to said flange and providing a flat lens seat, said ring having complemental notches therein aligned with said flange notches and said shoulder notches to provide light excluding tortuous passages through the wall of said eyecup, and means removably secured to said ring to clamp a lens against said flat lens seat, said lens securing means having an annular flange overhanging said passages.

6. Industrial goggles comprising tubular eyecups having their inner edges conforming generally to facial contour, said cups having tortuous light excluding passages through the walls thereof closely adjacent their outer edges, said cups having threaded openings through their adjacent walls intermediate said passages and said inner edges, hollow split bushings threaded into said openings, a ball chain having each end engaged in one of said bushings and forming a flexible bridge or nose piece adaptable for adjusting the spacing of said eyecups by rotating at least one of said bushings, so that the said inner edges may fit different facial contours snugly and substantially all ventilation is provided through the tortuous passages in said walls.

7. Industrial goggles comprising ventilated eyecups of the light excluding character described and with their inner ends conforming generally to facial contour, an adjustable bridge for said eyecups comprising a flexible nose piece terminating in thumb screws threaded through the side walls of said cups and accessible from inside said cups for rotation to adjust the length of said bridge.

8. In industrial goggles the combination with ventilated, light excluding and facial contour fitting eyecups of the character described having a flexible ball chain bridge therebetween, of a hollow split bushing threaded through a side wall of each cup, each bushing being capable of expansion when removed from its cup to receive one or more balls of said chain therein and adapted to retain said ball or balls in any threaded-in adjusted position of said bushing.

9. Industrial goggles comprising a pair of ventilated, light excluding and facial contour fitting eyecups of the character described, comprising a pair of tubular split bushings adapted to be threaded through the side walls of said eyecups with the split ends extending outwardly and their inner ends each formed to provide a thumb piece accessible for threaded adjustment of said bushing from inside its respective cup, a ball chain, the split end of each bushing forming a socket to receive and retain a ball of said chain when a bushing is threaded into an eyecup and adapted to enable removal or adjustment of said chain in said bushing when the bushing is removed.

10. Industrial goggles comprising substantially tubular eyecups of molded plastic having comparatively thick walls with their inner edges conforming generally to facial contour so that relative lateral adjustment will cause said inner edges to snugly fit different facial contours, said cups each having a flat uninterrupted outer edge surface forming a lens seat, a lens flat against said seat, a bezel threaded on said cup to secure said lens against said seat, said cup having an annular series of light excluding tortuous passages through the wall thereof with the inner ends of said passages terminating closely adjacent said lens seat and the outer ends remote therefrom, a bridge member forming a connection between said cups, means to adjust said bridge to vary the spacing between said cups, said adjusting means comprising a bushing attached to one end of said bridge and adjustably threaded into its respective cup intermediate said passages and said inner edges.

11. An eyecup for goggles comprising a substantially tubular base portion of molded plastic having its inner edge conforming generally to facial contour and its outer end of reduced diameter to form an annular outside shoulder, and a lens seat portion comprising an externally threaded ring of molded plastic of substantially the same inner and outer diameters as said base portion, and with its outer face forming an uninterrupted lens seat, and its inner face conforming in general contour to the shouldered end face of said base portion, said ring being permanently cemented to said base portion, at least one of said portions having grooves or the like molded therein to provide tortuous light excluding passages between said portions.

MARSHALL N. ANDERSON,
CLIFFORD L. ROE.